United States Patent [19]

Baumann

[11] Patent Number: 4,953,824
[45] Date of Patent: Sep. 4, 1990

[54] DEFLECTABLE SLEEVE TYPE VALVE

[76] Inventor: Hans D. Baumann, 32 Pine St., Rye, N.H. 03870

[21] Appl. No.: 488,627

[22] Filed: Mar. 5, 1990

[51] Int. Cl.$^5$ .............................................. F16K 7/06
[52] U.S. Cl. ...................................... 251/8; 137/315; 251/331
[58] Field of Search ................ 251/4, 5, 7, 8, 61.1, 251/331; 137/315

[56] References Cited

U.S. PATENT DOCUMENTS

| | | | |
|---|---|---|---|
| 1,024,877 | 4/1912 | Barbour | 251/8 |
| 2,285,974 | 6/1942 | Huber | 251/8 |
| 3,118,646 | 1/1964 | Markey | 251/331 |
| 3,159,373 | 12/1964 | Kroffke | 251/5 |
| 3,483,892 | 12/1969 | Sugimura et al. | 251/5 |
| 3,727,623 | 4/1973 | Robbins | 251/61.1 |
| 4,099,700 | 7/1978 | Young | 251/7 |

FOREIGN PATENT DOCUMENTS

| | | | |
|---|---|---|---|
| 497762 | 4/1930 | Fed. Rep. of Germany | 251/8 |
| 1163235 | 9/1958 | France | 251/8 |
| 87514 | 2/1958 | Netherlands | 251/7 |

*Primary Examiner*—George L. Walton

[57] ABSTRACT

The Deflectable Sleeve Type Valve is comprised of a metallic housing retaining therein a circular insert with fluid conducting ports, where said circular insert is surrounded by a flexible tubular sealing member. Said housing also retaining a plunger which, together with suitable actuating devices, is capable of readily displacing said tubular sealing member towards a port in said circular insert and therefore capable of interrupting fluid flow through said port.

3 Claims, 1 Drawing Sheet

DEFLECTABLE SLEEVE TYPE VALVE

BACKGROUND OF THE INVENTION

This invention relates to manually operated or actuator positioned modulating or shut-off valves to control the flow of fluid in a pipe conduit. The invention is especially suitable for use with sanitary media or highly corrosive fluids. This is a further improvement over my U.S. Pat. No. 4,822,002 issued on Apr. 18, 1989. Prior art reference is my U.S. Pat. No. 4,214,730 which teaches the art of constructing a reciprocating plug valve cooperating with Teflon (Tetrafluoroethylene) that is retained within a stainless steel housing. One major disadvantage of this prior construction is that is requires a stem packing seal which is subject to normal wear and could cause environmental problems due to stem leakage of acids or other dangerous chemicals handled by the valve.

Another prior art solution is shown in my U.S. Pat. No. 4,609,178. In this invention the stem is eliminated by the use of an elastomeric diaphragm which cooperates with a metal valve seat. The disadvantage here is that in order to be corrosion resistant, the valve housing has to be made from an expensive metal alloy. Also, due to problems with geometry, the design is not suitable for very small flow rates such as found in small pH control applications.

The present invention overcomes these and other objections as follows:

First, by using a cylindrical insert, within a pressure supporting metal housing, which is surrounded by a tube that simultaneously acts as stem seal and as valve closure member. Both the cylindrical insert and the sealing tube can be made from highly corrosion resistant plastic or from food grade type elastomers.

Secondly, the flow capacity of this valve can readily be changed by the interchange of a cylindrical insert with a different orifice or port size.

Thirdly, since the sealing tube is only slightly displaced towards its central axis, there is very little stress (in contrast to stem sealing bellows) guaranteeing a long life cycle.

Fourthly, the inherent simplicity of design insures a low manufacturing cost and parts that are free of critical tolerances.

Fifth, in contrast to the design of my U.S. Pat. No. 4,822,002, where the complete sleeve was displaced, I now employ a flat seating surface and only a partial circumferential displacement of the tube, thereby requiring substantially lower actuating force especially if said tube is made from plastic.

Finally, fine flow control is assured without the need of easily corroded metal parts being in contact with the fluid.

These and other advantages may be better understood in view of the following annexed drawings:

DESCRIPTION OF THE INVENTION

While the invention will be described in connection with the preferred embodiment, it will be understood that it is not intended to limit the invention to this specific design. While the invention is illustrated as motivated by a hand wheel, it should be understood that it is intended to replace such a hand wheel with a motorized actuating device in order to perform automatic control functions. For example, it is anticipated that an actuator and linkage combination similar to what is shown in my U.S. Pat. No. 4,684,103, may be used to position the tubular seal.

Figure 1:
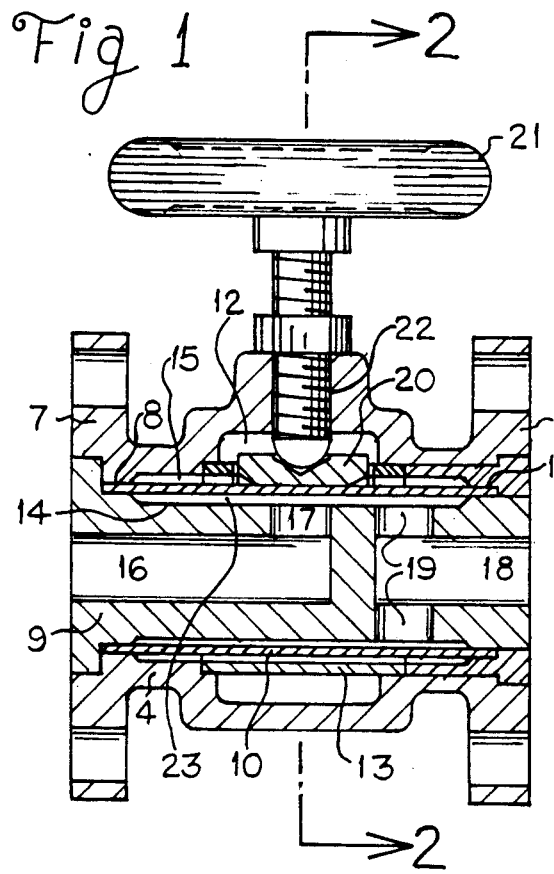
FIG. 1 is a vertical, central, cross-sectional view of a preferred embodiment of my invention in which the tubular sealing element is in a normal, central position to show an open orifice.
Figure 2:
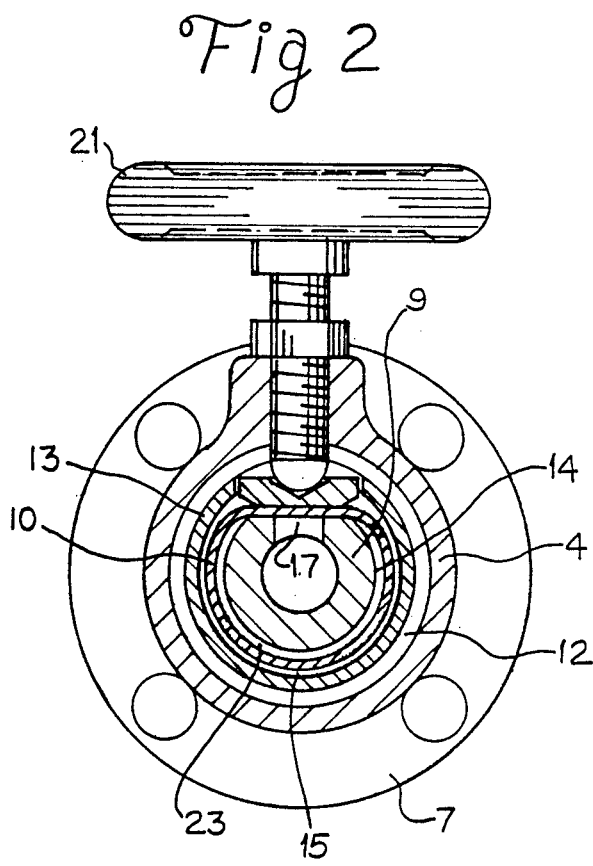
FIG. 2 is a vertical, cross-sectional view of the invention along the lines 2—2 in FIG. 1, with the tubular sealing element displaced to show the orifice covered.
Figure 3:
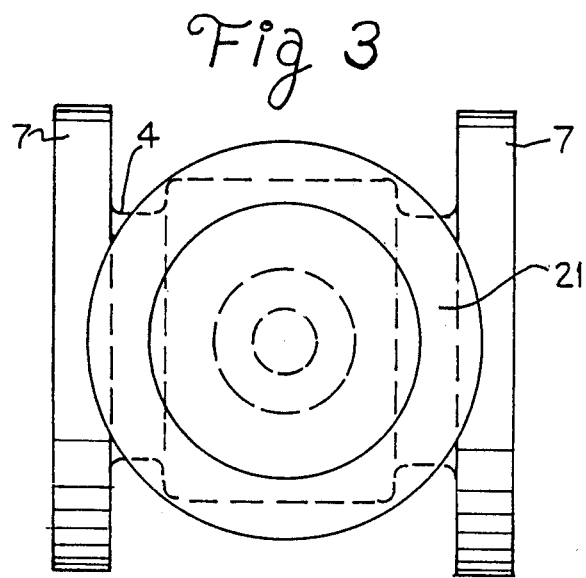
FIG. 3 is a top view of the invention.

Referring to FIG. 1, my invention is comprised of a one piece metal valve housing. Housing 4 has a pair of flanges 7 suitable to interconnect to similar flanges of a piping system. A bore 8 extends along the central axis of housing 4 and contains therein a cylindrical element 9 surrounded by a tubular seal 10. Bore 8 has a slightly reduced diameter in respect to tube 10 in order to provide a sealing interface along surface 11 so that fluid cannot escape. Otherwise, O-rings may be employed between the terminating ends of tubular seal 10 and cylindrical element 9. Within the central section of housing 4 there is a radial recess 12 slidingly engaging therein a sleeve 13 the interior of which surrounds tube 10.

Cylindrical insert 9 has a flattened portion 14 complimented by a similar, diametrical clearance 15 in housing 4, therefore allowing tubular seal 10 to a certain degree of eccentric displacement in respect to it's central horizontal axis. Cylindrical insert 9 has a longitudinal, central passage 16 terminating in a perpendicular orifice 17 and an opposite central access port 18 which communicates fluid through a number of vertical holes 19 into a space provided between flattened portion 14 and the inside diameter of sleeve 10.

As shown in FIG. 1, a plunger 20 is slidingly retained in a vertical bore of sleeve 13 which exerts against tubular seal 10, thereby causing the tubular seal sleeve 10 to displace a portion of its outer circumference and to cover orifice 17, thereby interrupting fluid flow. A hand wheel 21 is threadingly engaged at the upper extremity 22 of housing 4 and is capable of displacing plunger 20 up by allowing a stiffness of tubular seal 10 and the internal fluid pressure to disengage the inside of tube 10 from orifice 17 and restoring a conduit of fluid between port 18, bores 19, cavity 23, orifice 17, and finally port 16.

In a typical configuration, the diameter of the tubular seal element 10 might be 1" with a 0.050 wall thickness and a diameter recess at 15 of 0.050". This and support of tube 10 by sleeve 13 covering radial recess 12, insures that even at excess pressure levels the tube is never stretched beyond the elastic limit of it's material composition and therefore provides a very reliable fluid seal.

I claim:

1. Deflectable Sleeve Type Valve comprising:
   (a) a valve housing having a central horizontal bore and a central, enlarged cavity;
   (b) a unitary insert having a central access port terminating in at least one radially extending vertical orifice at one side of a partition wall portion and having a second opposite access port located along the same horizontal axis on the opposite side of the partition wall portion and communicating with at least one more vertical port to the exterior of said circular insert, said circular insert having a recessed exterior portion encompassing the areas where the orifice and at least one additional vertical port are located said circular insert being inserted within the horizontal bore while extending along the entire length of said valve housing and abutting a first shoulder means on said valve housing when said circular insert has been fully inserted within said valve housing and providing as slightly extending surface at both ends thereon to provide a fluid seal when the valve housing is attached to as piping system.

(c) a tubular seal extending and surrounding the substantial length of said circular insert and having their outer extremities retained within said cylindrical bore of the valve housing between said circular insert at said first shoulder means and a second shoulder means on the other end of the valve housing;

(d) a plunger slidingly engaged within the radial recess of said housing, the lower surface being in close contact with the outside diameter of said tubular seal;

(e) a mechanical actuating means attached to said valve housing and capable of displacement of said plunger and thereby forcing only the central portion of the tubular seal against said recessed exterior portion in order to open and close only said vertical orifice in the cylindrical insert circular insert to reduce the bending stresses on the tubular seal.

2. Deflectable Sleeve Type Valve as described in claim 1, wherein said plunger has a flattened lower surface and wherein the recessed exterior portion of the cylindrical insert is likewise flattened.

3. Deflectable Sleeve Type Valve as described in claim 1, wherein said tubular seal is surrounded and supported by a sleeve within the central enlarged body cavity.

* * * * *